3,324,195
UNSATURATED HYDROCARBONS BY OXIDATIVE DEHYDROGENATION OVER SILICONE-TREATED CATALYST
Francis C. S. Hwa, Somerset, and Laimonis Bajars, Princeton, N.J., assignors to Petro-Tex Chemical Corporation, Houston, Tex., a corporation of Delaware
No Drawing. Filed May 13, 1964, Ser. No. 367,210
7 Claims. (Cl. 260—680)

This invention relates to a process for dehydrogenating hydrocarbons and relates more particularly to the dehydrogenation of hydrocarbons at elevated temperatures in the presence of oxygen, a metal catalyst and a silicone oil.

The invention may be carried out, for example, by passing through a reactor a mixture of the hydrocarbon to be dehydrogenated and the silicone oil in the vapor state in an amount greater than about .001 gram per mol of the organic compound and at least 0.02 mol of oxygen per mol of the hydrocarbon.

According to this invention it has been discovered that in a certain process for the dehydrogenation of hydrocarbons in the presence of oxygen and a metal catalyst that the selectivities and yields of product may be increased by adding silicone oil to the catalyst. The mechanism of the effect produced is not understood but the silicone oil functions to activate the metal catalyst. The addition of the silicone oil may also be used to reactivate a catalyst which has lost activity due to continued use.

The silicone oils employed in this invention are silicone polymers having the general structure:

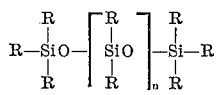

where R has from 1 to 7 carbon atoms and is selected from a group consisting of aliphatic or aromatic radicals and mixtures thereof, and $n$ is a number between 0 and 2700. The preferred range for $n$ would be between 60 and 350. Preferably R will have from one to 6 carbon atoms and will be selected from the group consisting of methyl, phenyl, vinyl, nitrile, halogen substituted aliphatic and aromatic radicals, and mixtures thereof. Suitable polymers are those such as where R is methyl, a mixture of methyl and phenyl (that is, where some R's are methyl and some are phenyl), —$CH_2$—$CH_2$≡N alone or mixed with methyl groups, vinyl alone or mixed with methyl groups, chlorophenyl alone or mixed with phenyl or methyl groups. The preferred polymers are those wherein R is methyl, phenyl or a mixture of 5 to 95 percent methyl with the remainder being phenyl groups.

The silicone polymers have viscosities from 0.65 to 2,500,000 centistokes at 25° C. but ordinarily will have viscosities between 50 and 1000 centistokes. The specific gravity at 25° C. will range from about 0.75 to 1.5.

The silicone oils can be added to the reaction in a number of different ways. All of the silicone oil may be added with the reactants entering the reactor or all or a portion of the silicone oil may be added down-stream in the reactor. The silicone oil may be added continuously or intermittently. The silicone oil may be added with the hydrocarbon, with the oxygen or in any other convenient manner, such as by adding directly to the metal catalyst. One technique for the addition of the silicone oil is by the use of a silicone oil aerosol. Solvents for the silicone oil may be included. The best results have been obtained by having the silicone oil in vapor phase when it contacts the metal catalyst.

The amount of silicone oil added may be varied, depending upon such factors as the age of the catalyst, the composition of the catalyst, the temperature at which the catalyst has been operated and so forth. The quantity of silicone oil added is generally relatively small such as at least about .001 gram of silicone oil added per mol of the hydrocarbon to be dehydrogenated, such as at a rate between 0.01 and 0.50 gram of slicone oil per mol of hydrocarbon to be dehydrogenated. Expressed another way, the amount of silicone oil added will ordinarily be from 0.0001 to 0.005 gram of the silicone oil per gram of the metal catalyst per day of operation.

The metal catalyst used for the process and to be activated by the silicone oil may vary somewhat. A variety of solid metals and non-volatile inorganic compounds thereof such as salts, oxides, hydroxides and the like have been found to be useful. The metals or compounds thereof may be present as reactor packings per se or may be distributed on the surface of supporting materials, such as pellets or rings. Suitable metal catalysts are those such as vanadium pentoxide, copper oxide, silver oxide, tin oxide, molybdenum oxide, antimony oxide, bismuth oxide, manganese oxide, potassium silicate, calcium nickel phosphate, iron oxide, the ferrite catalysts such as magnesium ferrite or zinc ferrite disclosed in copending applications, and the like. The preferred catalysts are the ferrites and catalysts of the fourth period of Group VIII, that is iron, cobalt and nickel and oxides thereof. Particularly preferred are catalysts having iron present in an amount of at least 50 weight percent of the catalytic surface.

Hydrocarbons to be dehydrogenated according to the process of this invention are hydrocarbons of 4 to 7 carbon atoms and preferably are aliphatic hydrocarbons selected from the group consisting of saturated hydrocarbons, monoolefins, diolefins and mixtures thereof of 4 to 5 or 6 carbon atoms having a straight chain of at least four carbon atoms, and cycloaliphatic hydrocarbons. Examples of preferred feed materials are butene-1, cis-butene-2, trans-butene-2, 2-methylbutene-3, 2-methylbutene-1, 2-methylbutene-2, n-butane, butadiene-1,3, cyclohexene, methyl butane, 2-methylpentene-1, 2-methylpentene-2 and mixtures thereof. For example, n-butane may be converted to a mixture of butene-1 and butene-2 or may be converted to a mixture of butene-1, butene-2 and/or butadiene-1,3. A mixture of n-butane and butene-2 may be converted to butadiene-1,3 or to a mixture of butadiene-1,3 together with some butene-2 and butene-1. Vinyl acetylene may be present as a product, particularly when butadiene-1,3 is used as a feedstock. Thus, the process of this invention is useful in converting hydrocarbons to less saturated hydrocarbons of the same number of carbon atoms. Useful feeds may be mixed hydrocarbon streams such as refinery streams, for example, the feed material may be the olefin containing hydrocarbon mixture obtained as the product from the dehydrogenation of hydrocarbons. For example, in the production of gasoline from higher hydrocarbons by either thermal or catalytic cracking a hydrocarbon stream containing predominantly hydrocarbons of 4 carbon atoms may be produced and may comprise a mixture of butenes together with butadiene, butane, isobutane, isobutylene and other ingredients in minor amounts. These and other refinery by-products which contain normal, ethylenically unsaturated hydrocarbons are useful as starting materials. Although various mixtures of hydrocarbons are useful, the preferred hydrocarbon feed contains at least 50 weight percent of a hydrocarbon selected from the group consisting of butene-1, butene-2, n-butane, butadiene-1,3 and mixtures thereof, and more preferably contains at least 70 weight percent, of one or more of these hydrocarbons (with both of these percentages being based on the total weight of the organc composition of the feed to the reactor). Any remainder may be, for example, essentially aliphatic hydrocarbons. This invention is particularly useful to provide a process whereby the major product of the hydrocarbon converted is a dehydrogenated hydrocarbon product having the same number of carbon atoms as the hydrocarbon fed.

Oxygen will be present in the reaction zone in an amount within the range of 0.2 to 2.5 mols of oxygen per mol of hydrocarbon to be dehydrogenated. Generally, better results may be obtained if the oxygen concentration is maintained between about 0.25 and about 1.6 mols of oxygen per mol of hydrocarbon to be dehydrogenated, such as between 0.35 and 1.2 mols of oxygen. The oxygen may be fed to the reactor as pure oxygen, as air, as oxygen-enriched air, oxygen mixed with diluents and so forth. Based on the total gaseous mixture entering the reactor, the oxygen ordinarily will be present in an amount from about 0.5 to 25 volume percent of the total gaseous mixture, and more usually will be present in an amount from about 1 to 15 volume percent of the total. The total amount of oxygen utilized may be introduced into the gaseous mixture entering the catalytic zone or sometimes it has been found desirable to add the oxygen in increments, such as to different sections of the reactor. The above described proportions of oxygen employed are based on the total amount of oxygen used. The oxygen may be added directly to the reactor or it may be premixed, for example, with a diluent or steam.

The temperature for the dehydrogenation reaction will be greater than 250° C., such as greater than about 300° C. or 375° C., and the maximum temperature in the reactor may be about 650° C. or 750° C. or perhaps higher under certain circumstances. However, excellent results are obtained within the range of or about 300° C. to 575° C. such as from or about 325° C. to or about 525° C. The temperatures are measured at the maximum temperature in the reactor. An advantage of this invention is that lower temperatures of dehydrogenation may be utilized than are possible in conventionl dehydrogenation processes. Another advantage is that large quantities of heat do not have to be added to the reaction as was previously required.

The dehydrogenation reaction may be carried out at atmospheric pressure, superatmospheric pressure or at subatmospheric pressure. The total pressure of the system will normally be about or in excess of atmospheric pressure, although sub-atmospheric pressure may also desirably be used. Generally, the total pressure will be between about 4 p.s.i.a. and about 100 p.s.i.a. Preferably the total pressure will be less than about 75 p.s.i.a. and excellent results are obtained at about atmospheric pressure.

Preferably the reaction mixture contains a quantity of steam, or an inert diluent with the range generally being between about 2 and 40 mols of steam per mol of hydrocarbon to be dehydrogenated. Preferably steam will be present in an amount from about 3 to 35 mols per mol of hydrocarbon to be dehydrogenated and excellent results have been obtained within the range of about 8 to about 30 mols of steam per mol of hydrocarbon to be dehydrogenated. The functions of the steam are several-fold, and the steam does not merely act as a diluent. Diluents generally may be used in the same quantities as specified for the steam. Excellent results are obtained when the gaseous composition fed to the reactor consists essentially of hydrocarbons, inert diluents and oxygen as the sole oxidizing agent.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally, the flow rates will be within the range of about 0.10 to 25 liquid volumes of the hydrocarbon to be dehydrogenated per volume of reactor containing catalyst per hour (referred to as LHSV), wherein the volumes of hydrocarbon are calculated at standard conditions of 25° C. and 760 mm. of mercury. Usually, the LHSV will be between 0.15 and about 5 or 10. The volume of reactor containing catalyst is that volume of reactor space excluding the volume displaced by the catalyst. For example, if a reactor has a particular volume of cubic feet of void space, when that void space is filled with catalyst particles, the original void space is the volume of reactor containing catalyst for the purpose of calculating the flow rate. The gaseous hourly space velocity (GHSV) is the volumes of the hydrocarbon to be dehydrogenated in the form of vapor calculated under standard conditions of 25° C. and 760 mm. of mercury per volume of reactor space containing catalyst per hour. Generally, the GHSV will be between about 25 and 6400, and excellent results have been between about 38 and 3800. Suitable contact times are, for example, from about 0.001 or higher to about 5 or 10 seconds, with particularly good results being obtained between 0.01 and 3 seconds. The contact time is the calculated dwell time of the reaction mixture in the reaction zone, assuming the mols of product mixture are equivalent to the mols of feed mixture. For the purpose of calculation of residence times, the reaction zone is the portion of the reactor containing catalyst.

The dehydrogenation reactor may be of the fixed bed or fluid bed type. Conventional reactors for the production of unsaturated hydrocarbons are satisfactory. Excellent results have been obtained by packing the reactor with catalyst particles as the method of introducing the catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, pumice and the like. When carriers are used, the amount of catalyst on the carrier will generally be between about 5 to 75 weight percent of the total weight of the active catalytic material plus carrier.

In the following examples will be found specific embodiments of the invention and details employed in the practice of the invention. Percent conversion refers to the mols of hydrocarbon consumed per 100 mols of hydrocarbon fed to the reactor, percent selectivity refers to the mols of product formed per 100 mols of hydrocarbon consumed, and percent yield refers to the mols of product formed per mol of hydrocarbon fed.

*Example 1*

Butene-2 was dehydrogenated to butadiene-1,3. The dehydrogenation was conducted in a fixed bed reactor containing an iron oxide catalyst. The iron oxide catalyst was prepared by adding 90 grams of 4 to 8 mesh alumina catalyst carrier, type AMC, to a slurry consisting of 30 grams of Fischer's ferric oxide black. The mixture was then evaporated to dryness and a catalyst containing 25 percent by weight of $Fe_3O_4$ coated on the carrier was obtained. 50 cc. of the catalyst was used as a catalyst bed. The reactor used was a 30 mm. O.D. Vycor reactor. The reaction mixture was a mixture of butene-2, oxygen, and steam in a ratio of 0.5 mol of oxygen per mol of butene-2 and 20 mols of steam per mol of butene-2. The flow rate of the butene-2 was 0.85 liquid hourly space velocity. After a total reaction time of 11.5 hours, the conversion was 34 mol percent, the selectivity was 76 mol percent, and the yield of butadiene-1,3 was 26 mol percent of the butene-2 fed to the reactor. The temperature of the reaction was 621° C. At this point, the catalyst was reactivated by the addition of Dow Corning 200 silicone oil. The Dow Corning silicone oil 200 has a general formula

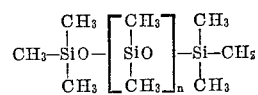

The silicone oil used had a viscosity of about 350 centistokes at 25° C., and the number average molecular weight was about 14,400. The silicone oil had a specific gravity at 25° C. of about .970 to .975. One gram of Dow Corning 200 silicone oil was dissolved in 10 cc. of benzene. 0.1 cc. of the silicone solution, containing 0.01 gram of the silicone oil, was injected into the steam inlet line at hourly intervals. After a total of 0.04 gram of the Dow-Corning 200 silicone oil was added to the system, the conversion had risen to 46 mol percent, the selectivity had risen to 87 mol percent, and the yield of butadiene-1,3 was 40 mol percent based on the butene-2 fed. The temperature of the reactor at this time was 612° C.

*Example 2*

Butene-2 was dehydrogenated to butadiene-1,3. The dehydrogenation was conducted in a fixed bed reactor containing an iron oxide catalyst. The iron oxide catalyst was prepared by adding 180 grams of 4 to 8 mesh alumina catalyst carrier, type AMC, to a slurry consisting of 60 grams of Fischer's ferric oxide black. The mixture was then evaporated to dryness and a catalyst containing 22 percent by weight of $Fe_3O_4$ coated on the carrier was obtained. 50 cc. of the catalyst prepared above was used as a catalyst bed. The reactor used was a 30 mm. O.D. Vycor reactor. The reaction mixture was a mixture of butene-2, oxygen, and steam in a ratio of 0.5 mol of oxygen per mol of butene-2 and 20 moles of steam per mol of butene-2. The flow rate of the butene-2 was 0.85 liquid hourly space velocity. After a total reaction time of 3 hours, the conversion was 37 mol percent, the selectivity was 81 mol percent, and the yield of butadiene-1,3 was 30 mol percent of the butene-2 fed to the reactor. The temperature of the reaction was 615° C. At this point, the catalyst was reactivated by the addition of silicone oil. The Dow-Corning Silicone Oil 710 has a general formula

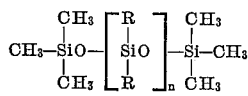

wherein R is phenyl and methyl in approximately equal ratios. The 710 silicone oil used had a viscosity of about 475–525 centistokes at 25° C., and the number average molecular weight was about 2,600. The silicone oil had a specific gravity at 25° C. of about 1.10. One gram of Dow-Corning 710[1] silicone oil was dissolved in 10 cc. of benzene. 0.2 cc. of the silicone solution, containing 0.02 gram of the 710 silicone oil, was injected into the steam inlet line at half hourly intervals. After a total of 0.1 gram of the 710 silicone oil was added to the system, the conversion had risen to 45 mol percent, the selectivity had risen to 88 mol percent, and the yield of butadiene-1,3 was 39 mol percent based on the butene-2 fed. The temperature of the reactor at this time was 615° C.

We claim:

1. In the process for the vapor phase dehydrogenation of hydrocarbons at an elevated temperature in the presence of oxygen and a metal catalyst comprising a member selected from the group consisting of iron, cobalt, nickel

[1] Described in Dow Corning reference 3-308 dated February 1956.

or mixtures thereof, the improvement comprising activating the metal catalyst by the addition of a silicone oil.

2. In the process for the vapor phase dehydrogenation of hydrocarbons at a temperature of greater than 250° C. in the presence of from 0.2 to 2.5 mols of oxygen per mol of said hydrocarbon and a metal dehydrogenation catalyst comprising a member selected from the group consisting of iron, cobalt, nickel or mixtures thereof, wherein the said metal catalyst gradually decreases in activity, the improvement comprising activating the metal dehydrogenation catalyst by the addition of a silicone oil having the formula

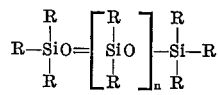

wherein R has from 1 to 6 carbon atoms and is selected from radicals of the group consisting of methyl, phenyl, vinyl, nitrile, halogen substituted aliphatic, halogen substituted aromatic radicals and mixtures thereof and $n$ is a number from 60 to 350.

3. In the process for the vapor phase dehydrogenation of hydrocarbons at a temperature of at least 250° C. in the presence of oxygen and a catalyst comprising iron, the improvement comprising activating the catalyst by the addition of a silicone oil.

4. In the process for the vapor phase dehydrogenation of hydrocarbons at an elevated temperature in the presence of oxygen and an iron oxide catalyst wherein the said iron oxide catalyst gradually decreases in activity, the improvement comprising activating the metal catalyst by the addition of a silicone oil having the formula

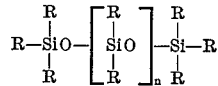

wherein R is selected from the group consisting of methyl radicals, phenyl radicals and mixtures thereof.

5. The process of claim 1 wherein the silicone oil has the formula

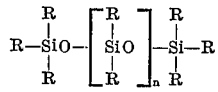

wherein R has from 1 to 7 carbon atoms and is selected from the group consisting of aliphatic radicals, aromatic radicals and mixtures thereof and $n$ is a number from 0 to 2700.

6. The process of claim 1 wherein the said hydrocarbon is butene.

7. The process of claim 1 wherein the metal catalyst comprises iron oxide.

References Cited

UNITED STATES PATENTS

| | | | |
|---|---|---|---|
| 3,116,338 | 12/1963 | Guest et al. | 260—666 |
| 3,168,587 | 2/1965 | Michaels et al. | 260—683.3 |
| 3,179,707 | 4/1965 | Lee | 260—669 |
| 3,207,811 | 9/1965 | Bajars | 260—680 |

DELBERT E. GANTZ, *Primary Examiner.*

G. E. SCHMITKONS, *Assistant Examiner.*